United States Patent [19]

Ernstrom et al.

[11] Patent Number: 4,689,234
[45] Date of Patent: Aug. 25, 1987

[54] PROCESS FOR THE PRODUCTION OF CHEESE

[75] Inventors: Carl A. Ernstrom; Charles G. Brown, both of Logan, Utah

[73] Assignee: DEC International Inc., Madison, Wis.

[21] Appl. No.: 794,484

[22] Filed: Nov. 4, 1985

[51] Int. Cl.⁴ .................. A23C 19/05; A23C 19/02
[52] U.S. Cl. ........................... 426/38; 426/39; 426/40; 426/491; 426/582
[58] Field of Search ............... 426/36, 38, 39, 40, 426/491, 582

[56] References Cited

U.S. PATENT DOCUMENTS

| | | | |
|---|---|---|---|
| 3,079,263 | 4/1961 | Foster et al. | 99/116 |
| 3,914,435 | 10/1975 | Maubois et al. | 426/40 |
| 3,963,837 | 6/1976 | Maubois et al. | 426/40 |
| 4,205,890 | 5/1980 | Maubois et al. | 426/40 |
| 4,355,048 | 10/1982 | Schaap et al. | 426/40 |
| 4,401,679 | 8/1983 | Rubin et al. | 426/36 |
| 4,460,609 | 7/1984 | Kristiansen et al. | 426/39 |
| 4,515,815 | 5/1985 | Kosikowski | 426/40 |

FOREIGN PATENT DOCUMENTS

A177931 11/1981 Australia.

OTHER PUBLICATIONS

Ernstrom et al., "Cheese Base for Processing", Journal of Dairy Sci., 63: 228-234; 1980.
Alcurd, "Continuous Cheese Coagulator", Alfa-Laval Filtration Systems.
"Continuous Cheese Base Process", Pasilac A/S.
"Continuous White Cheese Process (Feta)", Pasilac A/S.
"Continuous Mozzarella Process", Pasilac A/S.

Primary Examiner—Raymond N. Jones
Assistant Examiner—Marianne M. Cintins
Attorney, Agent, or Firm—Andrus, Sceales, Starke & Sawall

[57] ABSTRACT

A process and apparatus for the production of cheese. Milk is initially concentrated by ultrafiltration and diafiltration to obtain the desired buffer capacity to lactose ratio in the retentate. Following concentration, an acid, an acid precursor, or a lactic acid producing starter culture is added to the retentate and the retentate is fermented to obtain a final pH of about 4.9 to 5.6 and preferably 5.1 to 5.2. After complete fermentation, a coagulant, such as rennet, is added to the fermented retentate to produce curds. The curds are subsequently treated to remove moisture and obtain the final solids content and texture. The curds can then be drained, salted and pressed. By reaching to a final pH before coagulation, better pH control is obtained over the final product.

8 Claims, 1 Drawing Figure

PROCESS FOR THE PRODUCTION OF CHEESE

BACKGROUND OF THE INVENTION

Natural cheese varieties (hard and semi-soft) are produced from milk with the addition of a fermented starter culture and a suitable coagulant (rennet) so as to develop the proper flavor, aroma, and desired acidity. The resulting fermented coagulum is then cut and the curd is cooked in its whey. After cooking the whey is drained from the curd and the curd can then be cheddared or stirred while additional acid is produced by fermentation of the lactose to lactic acid in the curd. If cheddared, the curd is then milled, salted and pressed into blocks or hoops for maturing.

The processing conditions are controlled to yield a product in which the residual lactose and unused buffer capacity of the curd are balanced, so that complete fermentation of the residual lactose in the curd to lactic acid will result in a cheese with the proper pH, normally about 4.9 to 5.6.

In order to increase the yield, it has been proposed to alter the composition of whole or skim milk by utilizing ultrafiltration or reverse osmosis ("Composition Of Hard Cheese Manufactured By Ultrafilatration", B. J. Sutherland and G. W. Jameson, *Australian Journal of Dairy Technology*, pp. 136–143, December 1981). In a process of this type, milk is concentrated by ultrafiltration and diafiltration to about one-fifth of its original volume and the resulting concentrate is then transferred to conventional processing to form cheese either by a batch or continuous process.

In the production of hard type cheese such as cheddar, colby or stirred curd, the curd must be formed, cut, and handled under conditions that allow sufficient whey separation to reduce the moisture to levels acceptable for these cheese varieties. Since the milk has been concentrated by ultrafilatration and diafiltration, less whey is separated than in traditional cheese making. During or following whey separation, the curd must be moved or held for an extended incubation period to allow fermentation of sufficient lactose to achieve the desired final pH in the product. It is this incubation period that has created problems for the continuous manufacture of hard cheese without building large curd incubation systems into the processing equipment.

More recently, a process has been developed in which the moisture content and pH of the final product can be controlled to any desired level. In this process, as described in "Cheese Base For Processing: A High Yield Product From Whole Milk by Ultrafiltration", C. A. Ernstrom, B. J. Sutherland and G. W. Jameson, *Journal of Dairy Science*, 63, 228, (1980), whole milk is concentrated by ultrafiltration to about 40% of its original milk weight and then diafiltered at constant volume until a desired ratio of lactose to buffer capacity is established and then concentrated by ultrafiltration to about 20% of the starting milk weight. The retentate thus produced is inoculated with a bacteria starter culture and with or without a coagulant and fermented by conventional procedures to completely ferment the residual lactose and obtain precise control of the final pH.

SUMMARY OF THE INVENTION

The invention is directed to a process for producing cheese utilizing ultrafiltered milk and which is an improvement to the process described in the *Journal of Dairy Science*, referred to above. In accordance with the invention, milk is initially concentrated by ultrafiltration and diafiltration to obtain the desired buffer capacity to lactose ratio in the retentate. Following concentration, a lactic acid producing starter culture is inoculated into the retentate and the retentate is fermented in a fermenting tank to obtain the desired final pH, generally about 5.2.

After complete fermentation, the liquid fermented retentate is flowed from the fermenting tank and a coagulant, such as rennet, is added and mixed with the fermented retentate to produce a coagulum. The resulting coagulum is then cut or diced and continuously flowed through a moisture removing unit to remove moisture to obtain the final solids and texture. The curd is then drained, salted and pressed into hoops in the conventional manner.

By fermenting to the final pH before the addition of the coagulant, considerable time savings is achieved in the overall process. More particularly, the invention results in a substantial reduction of process time from when the coagulant is added to hooping of the cheese, because no curd incubation time is required. Further, the coagulant is capable of reacting more quickly in the completely fermented retentate than when added with the starter culture, as in conventional cheese making processes.

Because the retentate being fermented is in a liquid form, the fermentation can be carried out in large tanks as opposed to the need for large incubator systems which are required when the fermentation is carried out in the curd. The use of fermenting tanks results in a substantial savings in equipment cost and maintenance over a curd incubator.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
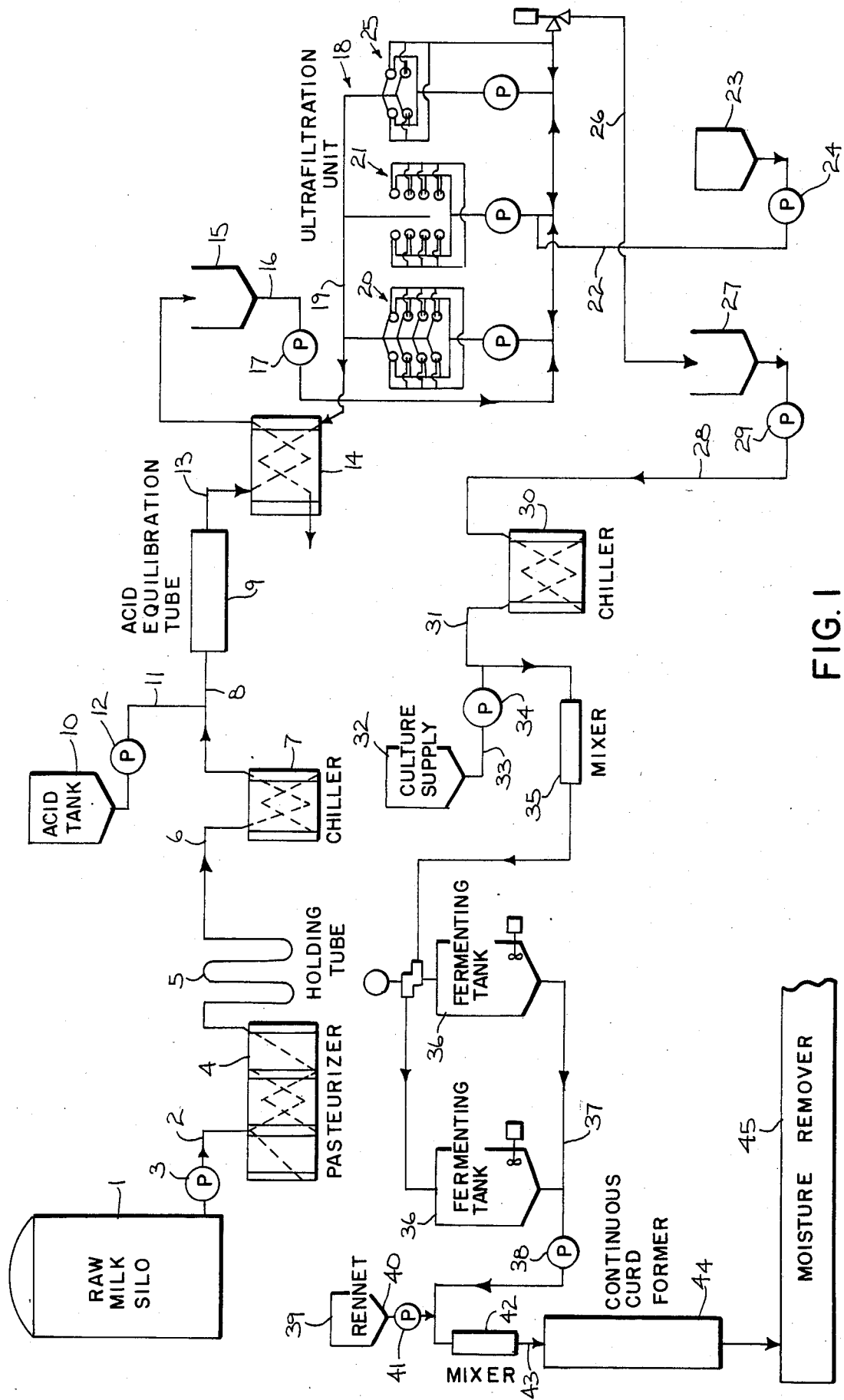
FIG. 1 is a flow sheet showing the process of the invention.

As shown in the drawing, raw milk is contained within a tank or silo 1. The milk can either be skim milk, in which the total fat has been removed, or the milk can be standardized by conventional procedures to obtain the desired protein/fat ratio by removal or addition of cream. If skim milk is used in the process, the cream removed from the milk is concentrated to about 40% to 80% fat and subsequently remixed with the final retentate to obtain the desired fat concentration in the retentate.

The milk is discharged from tank 1 through line 2 by pump 3 and passed through a conventional pasteurization unit 4 and holding tube 5, which serve to heat the milk to a temperature of 71.7° C. (161° F.) for a period of about 15 to 20 seconds. The pasteurized milk flows through line 6 to a chiller unit 7 where the temperature of the milk is reduced to a value of about 1° C. (33° F.).

The chilled milk then flows through line 8 to an acid equilibration tube 9. An acid, such as concentrated hydrochloric acid, or other food grade acid, contained within a tank 10 is metered through line 11 by a metering pump 12 into the chilled milk prior to the introduction of the milk into the tube 9. The acidification is one method that facilitates calcium removal during the subsequent ultrafiltration and diafiltration steps. The milk will acidify to a pH range of about 5.6 to 6.2.

The pre-acidified milk then flows through line 13 from tube 9 to a plate-type heat exchanger 14 where the milk is heated to a temperature in the range of about 43.3° C. to 54.5° C. (110° F. to 130° F.), and then to a balance tank 15.

The heated milk is pumped from balance tank 15 through line 16 by pump 17 to the ultrafiltration unit indicated generally by 18 where the milk is concentrated. The permeate is discharged from the ultrafiltration unit 18 through line 19 and is returned to the heat exchanger 14 where it serves to aid in heating the milk.

The first stage 20 of the ultrafilatration unit 18 performs the initial concentration of the milk, while the second stage 21 is the diafiltration section, whereby diafiltration water is added through line 22 from the diafiltration water tank 23 by pump 24. The third stage 25 performs the final concentration.

The retentate from the third stage 25 represents completion of the concentration of the milk as retentate. The retentate is then conducted from the ultrafiltration unit 18 through line 26 to balance tank 27.

The purpose of the ultrafiltration and diafiltration is to obtain the desired levels of moisture and lactose in the concentrate and to remove soluble minerals. Generally the milk will be concentrated in a ratio of about 1:1 to 10:1, with a concentration ratio of 3:1 to 6:1 being preferred. Through the ultrafiltration and diafiltration the ratio of buffer capacity to lactose can be adjusted so that the desired pH in the final product can be obtained.

In practice, the milk is concentrated in the ultrafiltration unit to remove about 50% to 70% by weight of the milk as the permeate. The retentate fraction is then subjected to diafiltration until the amount of water added is from about 15% to 90% of the weight of the original milk, and preferably about 60%. The amount of diafiltration water depends upon the pH desired in the final curd, as well as the pH of the milk prior to fermentation. Ultrafiltration continues after diafiltration ceases until the retentate fraction amounts to about 15% to 30% of the weight of the original milk.

As previously noted, the ultrafiltration and diafiltration operations are adjusted so as to achieve the desired buffer capacity to lactose ratio. Buffer capacity is defined as the milliequivalent of acid needed to reduce the pH of 100 grams of retentate from its initial pH to pH 5.1. The greater the buffer capacity, the more lactose must be left in the retentate to achieve the proper pH when it is fermented to lactic acid. For example, if the initial pH of the retentate is about 6.2, a ratio of buffer capacity to lactose of 16.7 to 26.6 milliequivalents per gram at the end of the third ultrafilatration step will yield a final fermented curd with a pH of between 5.0 and 5.3

If skim milk is used as the starting material the cream can be added to the retentate after ultrafiltration to achieve the desired fat concentration in the retentate.

As shown in the drawing, the retentate is discharged from the balance tank 27 through line 28 by pump 29 and is passed through a chiller unit 30 which reduces the temperature of the retentate to a value of about 25° C. (77° F.). The chilled retentate is then discharged from chiller unit 30 through line 31 and a fermenting agent is then innoculated into the chilled retentate. The fermenting agent can be an acid, such as hydrochloric acid or other food grade acid, an acid percursor such as glucono delta lactone, or a lactic acid producing starter culture. The lactic acid producing bacteria can be any conventional starter culture as used in cheese making processes, such as *Streptococcus lactis* or *Streptococcus cremoris*, or a combination thereof.

The starter culture contained in tank 32 is metered through line 33 by metering pump 34 and mixed with the chilled retentate in an in-line mixer 35. The retentate is then fed to one or more fermenting vessels 36 where it is maintained at a temperature of about 20° C. to 30° C. (68° F. to 86° F.) and preferably 25° C. for a period of time necessary to achieve a final pH of about 4.9 to 5.6 and preferably from 5.1 to 5.2. The residence time in the fermenting vessel will be sufficient to obtain the final desired pH and convert the residual lactose to lactic acid. This time will depend on the type of cheese being produced and the lactic starter culture being use. If an acid or acid precursor is used, holding time in the fermentation tank need be only long enough to insure stabilization of the pH.

Following complete fermentation or acidification, the fermented or acidified retentate in a liquid form and at a temperature of 20° C. to 30° C. (68.° F. to 86° F.) is discharged from vessels 36 through line 37 by pump 38 and a coagulant, such as rennet, contained in tank 39 is metered into the fermented retentate through line 40 by metering pump 41. The rennet is mixed with the fermented retentate in an in-line mixer 42 and flows through line 43 to a continuous curd former 44. In practice, the coagulum is retained in the continuous curd former for a period of about 1 to 30 minutes, depending upon the type of cheese being produced.

Suitable knives are positioned at the outlet of the curd former 44 to cut or dice the curd. The curd is then discharged to a moisture removal unit 45 where the curd is treated to remove moisture and produce the desired final moisture content and texture for the curd.

Following the removal of moisture, further treatment of the curd depends on the type and variety of cheese being produced.

By fermenting or acidifying to a final pH before coagulating, a considerable time savings is achieved in the overall process. In particular, there is a substantial reduction in time from when the coagulant is added to the final hooping of the cheese.

By utilizing fermenting vessels, the process can be made continuous with the residence time in the fermenting vessels correlated with the number of vessels so that there would be a continuous flow of fermented retentate to the continuous curd former.

As' fermentation or acidification is accomplished when the retentate is in a liquid form, the fermentation or acidification can be carried out in vessels, as opposed to fermenting in a large curd incubator which is required when the fermentation is carried out in curd. The use of fermenting vessels results in a substantial cost savings over the use of complex curd incubator systems.

Various modes of carrying out the invention are contemplated as being within the scope of the following claims particularly pointing out and distinctly claiming the subject matter which is regarded as the invention.

We claim:

1. A process for the production of cheese from milk, comprising the step of concentrating the milk by ultrafiltration and diafiltration to form a retentate, adjusting the extent of ultrafiltration and diafiltration to obtain a desired buffer capacity to lactose ratio insaid retentate, adding a lactic acid producing material selected from the group consisting of an acid and an acid producing substance to said retentate, fermenting the retentate without the addition of a coagulent until the pH reaches a desired predetermined value in the range of 4.9 to 5.6 to produce a substantially completely fermented liquid retentate, thereafter adding a coagulant to the completely fermented liquid retentate to coagulate the retentate and produce a coagulum, continuously flowing the caogulum through a curd forming zone to produce curds, cutting the curds discharged from said zone and removing moisture from the curds to achieve a desired moisture value and texture for said curds.

2. The process of claim 1, and including the step of cooling the retentate prior to adding the lactic acid producing material to a temperature in the range of about 25° C.

3. The process of claim 1, and including the step of maintaining the temperature of the fermented liquid retentate in the range of 20° C. to 30° C. during the addition of said coagulant.

4. The process of claim 1, wherein said material is an acid precursor.

5. The process of claim 1, wherein said material is a food grade acid.

6. The process of claim 1, wherein said material is a lactic acid starter culture.

7. A process for the production of cheese from milk, comprising the steps of concentrating milk by ultrafiltration and diafiltration to form a retentate, adding a lactic acid producing material selected from the group consisting of an acid and an acid producing substance to said retentate, fermenting the retentate without the addition of a coagulant to provide a pH in the range of 4.9 to 5.6 and produce a substantially completely fermented liquid retentate, adding a coagulant to the completely fermented liquid retentate to coagulate the retentate and produce a coagulum, and continuously flowing the coagulum through a curd forming zone to produce curds.

8. The process of claim 7, wherein the steps of ultrafiltering and diafiltering are continued until the retentate comprises from 15% to 30% of the original milk weight.

* * * * *